United States Patent [19]

Hoye et al.

[11] Patent Number: 4,752,626

[45] Date of Patent: Jun. 21, 1988

[54] METHOD OF MAKING LOW COMPRESSION SET URETHANE FOAMS

[75] Inventors: Robert J. Hoye, Trenton; Vabilisetti S. Murty, Rochester; Kaneyoshi Ashida, Farmington Hills; Chin-Jui Chang, Detroit, all of Mich.

[73] Assignee: General Motors Corporation, Detroit, Mich.

[21] Appl. No.: 90,008

[22] Filed: Aug. 27, 1987

[51] Int. Cl.[4] .............................................. C08G 18/14
[52] U.S. Cl. .................................... 521/175; 521/176
[58] Field of Search ................................ 521/175, 176

[56] References Cited

U.S. PATENT DOCUMENTS 4,067,759 1/1978 Vrolyk et al. ......................... 156/94

OTHER PUBLICATIONS

Ashida et al., *International Progress in Urethanes*, vol. 2, Technomic Publishing Co., pp. 153–173, 1980.
Ashida et al., *International Progress in Urethanes*, vol. 3, Technomic Publishing Co., pp. 173–179, 1980.
Saunders et al., *Polyurethanes*, Interscience, pp. 161–173 & 208–215, 1962.
Oentel, *Polyurethane Handbook*, Hansen, pp. 90–96, 1985.

Primary Examiner—Maurice J. Welsh
Attorney, Agent, or Firm—R. W. Tung

[57] ABSTRACT

This invention generally relates to a high resilience urethane foam (HR foam) having low compression set at a wide range of isocyanate index for use in small void filling in integrated foam parts.

The small voids formed in the molding process of integrated foam parts can be filled without penetration of foaming liquids into existing foam cells. In addition, resulting foams have very low compression set values at a wide range of isocyanate index.

The foaming system of the present invention is composed of two components, i.e., thixotropic polyisocyanate component and thixotropic polyol component. Their thixotropicity is obtained by adding benzal sorbitol into respective components. The polyisocyanate is selected from organic polyisocyanates and the polyol component is prepared by mixing a polyol blend composed of a polyolefinic polyol and a polyoxyalkylene polyol in a weight ratio between 95/5 to 50/50, a blowing agent, a surfactant and a catalyst.

9 Claims, No Drawings

METHOD OF MAKING LOW COMPRESSION SET URETHANE FOAMS

FIELD OF THE INVENTION

This invention generally relates to a high resilience urethane foam having a low compression set value and more specifically, to a high resilience foam having low compression set value at a wide range of isocyanate index for use in small void filling in integrated foam parts. The small voids formed in the molding process of integrated automobile seats can be filled without impregnation of foaming liquids into existing foam cells. In addition, resulting foams have very low compression set values at a wide range of isocyanate index.

BACKGROUND OF THE INVENTION

The latest trend in the development of automotive foam parts is integrated molded seats which is expected to improve productivity and significantly reduce labor costs. These seats are usually produced by pouring urethane foaming liquid mixture onto a surface covering material, e.g., cloth, vinyl, etc., prepositioned in a mold. The mold is then closed and the foaming mixture is allowed to expand and fill the mold cavity such that the resulting product is an integrated seat composed of a surface covering material and a urethane foam core.

The integrated foam parts sometimes have surface defects of small voids, e.g., in a volume between 1 to 10 cubic centimeters. These voids become a cause of rejection for the integrated foam parts which result in higher production costs. Void filling by means of a mini-scale foaming with urethane foams could significantly reduce the production costs. By mini-scale foaming, we mean a foaming process in which only a small amount of foaming reactants are mixed together to form a volume of foam less than 10 cubic centimeters.

Existing techniques of producing urethane foams have many drawbacks when used in mini-scale foaming. These drawbacks include higher compression set values of the foam produced and formation of hard spots by the penetration of foaming liquid into the existing foam cells. This invention provides a novel method to solve these problems by employing specific polyols and specific thixotropic agents.

It is known that polyurethane foams are prepared by the reaction of a polyisocyanate with a polyol in the presence of a blowing agent, a surfactant and a catalyst. It is also known that high resilience (HR) urethane foams are prepared by using a graft polyol or a urea-dispersion polyol as the polyol component and toluene diisocyanate (TDI), diphenylmethane diisocyanate (MDI), or a mixture of TDI and MDI as the polyisocyanate component. Such HR foams have been used for automotive seat cushions and furniture cushions.

Conventional methods of producing automotive seats have been composed of labor-intensive processes, and therefore, reduction of its production costs were difficult. A latest trend in automotive seat production is the one step process for producing automotive seats. This is called an integrated molded seat process. Due to its one step process, it can save labor costs and significantly increase productivity.

The process is composed of the following operating steps: a cloth or vinyl material as a surface covering material is prepositioned on the inner surface of a mold; a urethane foaming mixture is poured onto the surface of the cloth in the mold and the mold lid is immediately closed; the foam is allowed to expand in order to fill the mold cavity. Seat cushions frequently have a concave surface, and therefore, air voids have the tendency to form on the surface of the molded part.

Attempts have been made to use existing urethane foam technologies to solve the problem of air voids in integrated molded foam seats. However, such attempts have resulted in no success due to several reasons. First, the void filling is a mini-scale foaming and the exothermic reaction heat dissipates faster than desired. As a result, the foams produced are not completely cured and have a high compression set. Secondly, the conventional urethane-foaming reactants are in a low viscosity liquid state and, therefore, penetrate easily into existing foam cells, which then become hard spots. Finally, in mini-scale foaming, where the total volume of foam is small, even a minute variation in the quantity of the components mixed can significantly change their ratio and further affect the compression set property.

It is therefore an object of the present invention to provide a method of making small volume of urethane foam which has high resiliency and low compression set.

It is another object of the present invention to provide a method of making small volume of urethane foam in which the properties of the foam produced is more tolerable to errors in the isocyanate/polyol mixing ratios.

It is yet another object of the present invention to provide a method of making small volume of urethane foam in which the viscosity of the reactants is sufficiently high such that the reactants cannot penetrate into existing foam cells when said reactants are injected into an air void situated in an integrated foam part.

SUMMARY OF THE INVENTION

This invention relates to a method of making low density, high resilience foams having low compression set at a wide range of isocyanate index, by means of mini-scale foaming of polyurethane foams without the penetration of the liquid foaming reactants into existing foam cells.

Our novel foaming system has two components. The polyol component used in the present invention is composed of a blend of a polyolefinic polyol and a polyoxyalkylene polyol in a weight ratio of 95/5 to 50/50. This polyol mixture is further blended to make a premix composed of the polyol, a surfactant and a catalyst.

The polyisocyanate component used in the present invention is an organic polyisocyanate, preferably diphenylmethane diisocyanate in its liquid state.

A thixotropic agent selected from benzal sorbitols, e.g., dibenzal sorbitol, is used to increase the viscosity of our foaming reactants. About 0.5 to 2 percent by weight of the thixotropic agent is added to both the polyol and the polyisocyanate components. The foams are prepared by using these thixotropic agent modified systems which do not penetrate existing foam cells, and thus producing a foam having low density and low compression set at a wide range of isocyanate index such that errors in the mixing ratio do not affect foam properties.

DETAILED DESCRIPTION OF A PREFERRED EMBODIMENT

The novelty of the present invention resides in the method of making a high resilience urethane foam having low compression set and high resilience at a wide range of isocyanate index by means of mini-scale foam-in-place into the surface voids of integrated molded seats.

The superiority of the present invention is that the resulting foams have an outstanding compression set value at a wide range of isocyanate index, and the liquid foaming mixture does not penetrate into existing foam cells to form hard spots.

It has been recognized by the art that flexible urethane foams produced with an incomplete cure or at lower and higher isocyanate indices result in poor compression set values.

Mini-scale foam-in-place, e.g., 1 to 10 cubic centimeters, at room temperature has a poor curing condition due to the dissipation of reaction heat, which results in foams having high compression set values. This was not a problem in the past since large scale foaming processes were used which generate enough reaction exotherm in slab stock and molded foams. Therefore, no new development in the technology for mini-scale foam-in-place process was available. Only recently, the demand for mini-scale foaming has become important because the integrated molded foam process has been adopted in the automotive seat productions.

In this process, a covering cloth is first positioned on the inner surface of an open mold. Then a urethane-foaming mixture is poured on the covering cloth. Immediately after the pouring, the mold lid is closed and the foaming mixture is allowed to expand in the mold. The molded foam occasionally has small surface voids formed by trapped air bubbles in the molding process.

The surface void defects are one of the major causes for rejections. Thus, surface void filling by means of a mini-scale foam-in-place process can significantly reduce such rejections and consequently the production costs of integrated automobile seats.

Void filling by conventional urethane foam technology has encountered several serious problems, including (a) mini-scale foaming results in the dissipation of reaction heat which leads to incomplete reaction, and therefore high compression set values, (b) mini-scale foaming is accompanied by a relatively large error in the mixing ratio of the foaming ingredients (or the isocyanate index), which also results in higher compression set values, and (c) conventional foaming mixtures are low viscosity liquids and penetrate into existing urethane foam cells to form hard spots. It is therefore the purpose of the present invention to solve all these problems.

The polyisocyanate we have used in the present invention is an organic polyisocyanate, having at least two isocyanate groups in the molecule. Some examples are 4, 4'-diphenylmethane diisocyanate (MDI), modified MDI, polymeric MDI, 2, 4-toluene diisocyanate, 2,6-toluene diisocyanate and mixtures thereof, meta and para, xylylene diisocyanate and mixtures thereof, and meta and para phenylene diisocyanate. Preferable organic polyisocyanates in the present invention are liquefied MDI modified by carbodiimide linkages or isocyanate-terminated urethane prepolymers. Some of the commercial products include Isonate® 181 (Dow Chemical), Lupranate® MI (BASF), Isonate® 143L (Dow Chemical), Code 129 (Dow Chemical), etc.

The polyol we have used in the present invention is a blend polyols, composed of a polyolefinic polyol and a polyoxyalkylene polyol.

The use of only a polyolefinic polyol results in low compression set foams at a wide range of isocyanate index, e.g., between 60 to 140. However, all of the resulting foams had higher than acceptable foam densities. The choice of surfactants and catalysts did not solve these problems. We believe the reason for producing high density foam was that water (blowing agent) has poor compatibility with the polyolefinic polyol, and as a result, some of the carbon dioxide gas generated escaped from the rising foam which resulted in higher density foams.

We have discovered, however, that a blend of a polyolefinic polyol and a polyoxyalkylene polyol significantly improves the compatibility of the blended polyol with water and, therefore, lower density foams are produced.

The polyolefinic polyol we used in the blends includes hydroxyl-terminated polybutadiene, hydroxyl-terminated polyisoprene, and hydrogenated products thereof. The molecular weight of the polyolefinic polyols falls in a range of 1,000 to 5,000. The backbone can be either saturated or unsaturated hydrocarbons. Some of the commercial products are Poly BD® 45HT and Poly BD® 45M (hydroxyl-terminated polybutadienes, Arco Chemical Company) and Polytail® H and Polytail® HA (hydrogenated products of polybutadiene, Mitsubishi Chemical Ind. Ltd.).

These polyolefinic polyols can be used alone or in combination, i.e., two or three kinds of polyolefinic polyols can be blended for use as the polyolefinic polyol component in the present invention.

The polyoxyalkylene polyols we used in the present invention include polyoxypropylene polyols having a functionality of three and a molecular weight of about 3,000 to 6,000 and poly (oxypropylene-oxyethylene) polyols having a functionality of three, and a molecular weight of about 3,000 to 6,000. We have also used other types of polyoxyalkylene polyols such as graft polyols (grafted with styrene and/or acrylonitrile) and polyurea dispersion polyols. These polyols are prepared by modifying Poly (oxypropylene) polyols. The graft polyols are prepared by grafting acrylonitrile or a blend of acrylonitrile and styrene monomers in the reaction phase of a poly (oxyalkylene) polyol in the presence of a peroxide catalyst.

Examples of the grafted polyols are Niax® 31-28, Niax® 34-28 (Union Carbide Corporation) and Pluracol® 1003 (BASF Corporation). The urea dispersion polyols are produced by adding TDI with vigorous stirring into a mixture of hydrazine (or other amines) and a poly (oxyalkylene) polyol. Examples of the urea dispersion polyols are Multranol® 9151 and Multranol® 9225 (Mobay Chemical Company).

The blend ratio of the polyolefinic polyol and the polyoxyalkylene polyol employed in the present invention is in the range between 95/5 to 50/50, where the polyolefinic polyol is the major polyol. As we have discovered, the single use of polyolefinic polyols gives acceptable compression set values but relatively high density foams, because single use of the polyol results in coarse cell foams and some of the blowing gas escapes from the rising foam.

This high density problem is solved by the present invention, that is, by the technique of blending a polyoxyalkylene polyol with a polyolefinic polyol. The blended polyol results in lower density foams because no gas escape takes place from the expanding foam due to improved compatibility of the blended polyols with the blowing agent.

The blend ratio of the two can be changed in the range of 95/5 to 50/50, but a preferred range is 90/10 to 60/40. A more desirable range is about 80/20 to 70/30. The blowing agent to be used in the present invention includes reactive and non-reactive blowing agents The major reactive blowing agent is water, which generates carbon dioxide from the reaction with isocyanate groups. Other types of reactive blowing agents are nitroalkanes, aldoximes, etc., which are described in a book entitled "International Progress in Urethanes", Volume 2, Pages 153-173 (Technomic Publishing Co., Inc., 1980). Non-reactive blowing agents, e.g., trichlorofluoromethane (so-called R-11 or CFC-11, b.p. 24° C.) can be used in combination with water. However in the case of a mini-scale foam-in-place process for surface void fillings, CFC-11 is not effective because of fast dissipation of the reaction exothermic heat.

The catalysts we have used in the present invention include urethane foam catalysts, e.g., tertiary amines and tin catalysts. The urethane foam catalysts are described in various literature and, therefore, they are well-known in the art. Some examples of urethane catalysts are described in the book entitled "Polyurethanes, Chemistry and Technology", by Saunders and Frisch, Interscience Publishers (1962), and Oertel, G. "Polyurethane Handbook", Hanser Publishers, Munich, Vienna, New York (1985).

The same situation applies for the surfactants used in the present invention. Many kinds of urethane foam surfactants are available on the market. Some of the examples are disclosed in the books cited above.

Thixotropic agents are employed in the present invention to prevent the impregnation of liquid foaming ingredients into existing urethane foam cells. This is one of the most important advantages of the present invention. Such thixotropic agents include benzal sorbitols, which include monobenzal sorbitol, dibenzal sorbitol, tribenzal sorbitol, dibenzal dimethyl sorbitol, and dibenzal monoacetyl sorbitol.

Thixotropic polyisocyanate component and thixotropic polyol component can be prepared by adding a benzal sorbitol in an amount between 0.1 to 5 weight percent of the respective component. The sorbitol can be dissolved by stirring with a polyisocyanate or a polyol blend at elevated temperatures, e.g., 60 to 90 degrees Centigrade. After cooling to room temperature, the mixture forms a thixotropic substance. Some of these techniques are described in a book entitled "International Progress in Urethanes", Vol., 3, pages 173-180, edited by K. Ashida and K. C. Frisch, and published by Technomic Publishing Co., Inc., in 1981.

Our thixotropic urethane system does not flow into foam cells and, therefore, no hard spots are formed. On the contrary, conventional urethane systems are low viscosity liquids and, therefore, the foaming mixture penetrates into foam cells and produces a high density foam cell crust which results in a hard spot in the seat cushion.

One of the most remarkable and unexpected advantage achieved by the present invention is that the resulting foams have small compression set values at a wide range of isocyanate index, e.g., 80-120.

According to prior art techniques, reducing isocyanate indices, e.g., from 120 to 80, significantly increases compression set values. Therefore, the above findings are completely unexpected.

The wide range of isocyanate index makes it possible to make mini-scale foaming-in-place into the surface void of integrated automotive seat cushions without a precise mixing device. For instance, our novel invention can be practiced by using very inexpensive devices such as a simple two-part syringe.

The following examples illustrate the novelty and the superiority of the present invention. Table 1 shows raw materials employed for the study of the present invention.

TABLE 1

RAW MATERIALS EMPLOYED

| Designation | Chemical Composition | Equivalent Weight | Supplier |
|---|---|---|---|
| Polytail ® HA | Hydrogenated polyolefinic polyol | 1100 | Mitsubishi Chemical |
| Poly BD ® R45M | Polyolefinic polyol | 1330 | Arco Chemical |
| Multranol ® 3901 | Ethylene oxide capped polyether polyol | 2000 | Mobay |
| Multranol ® 9151 | Polyurea-dispersion polyol | 2000 | Mobay |
| Niax ® 31-28 | Acrylonitrile-grafted polyether polyol | 2000 | Union Carbide Corp. |
| Niax ® 34-28 | Acrylonitrile/styrene-grafted polyether polyol | 2000 | Union Carbide Corp. |
| Pluracol ® 726 | Polyether polyol | 970 | BASF |
| Freon ® 11A | $CCl_3F$ | — | DuPont |
| DC-190 | Silicone surfactant | — | Dow Corning |
| Niax ® A1 | Amine catalyst | — | Union Carbide Corp. |
| Dabco ® | Amine catalyst | — | Air Products |
| T-9 | Tin catalyst | — | Air Products |
| Isonate ® 143L | Liquefied MDI | 144 | Dow Chemical |
| Isonate ® 181 | Liquefied MDI | 183 | Dow Chemical |
| Code 129 | Liquefied MDI | 130 | Dow Chemical |
| Lupranate ® MI | Liquefied MDI | 125 | BASF |

TABLE 2

POLY BD R45M-CODE 129 FOAMS

| EXAMPLE NO: | 1 | 2 | 3 | 4 |
|---|---|---|---|---|
| FORMULATIONS: | #100 | #101 | #102 | #103 |
| Poly BD ® R45M, g | 70 | 70 | 70 | 70 |
| Niax ® 31-28, g | 30 | 0 | 0 | 0 |
| Niax ® 34-28, g | 0 | 30 | 0 | 0 |
| Multranol ® 9151, g | 0 | 0 | 30 | 0 |
| Multranol ® 3901, g | 0 | 0 | 0 | 30 |
| Water, g | 2.5 | 2.5 | 2.5 | 2.5 |
| Dabco ® 33LV, g | 0.8 | 0.8 | 0.8 | 0.8 |
| DC-190, g | 1.5 | 1.5 | 1.5 | 1.5 |
| Dabco ® T-12, g | 0.06 | 0.06 | 0.06 | 0.06 |
| NCO Index 105 (Code 129) | 105 | 105 | 105 | 105 |
| PROCESSING: | | | | |
| Initial temp., °C. | 24 | 24 | 24 | 24 |
| Cream time, sec. | 5 | 5 | 6 | 6 |
| Rise time, sec. | 85 | 88 | 85 | 95 |
| Appearance | normal | normal | normal | normal |
| PHYSICAL PROPERTIES: | | | | |
| Density, $Kg/m^3$ | 49.6 | 48.1 | 48.8 | 44.3 |
| Compression Set: 50% | 8.32 | 7.4 | 7.4 | 8.7 |
| Humid Aging: 50%, 105° C., 6 Hrs. | 5.6 | 5.2 | 4.9 | 4.2 |
| CLD (50%) KPa: | 24.9 | 22.7 | 18.3 | 17.2 |

TABLE 3

POLY BD-MULTRANOL 3901 - CODE 129 FOAMS USING DBS*

| EXAMPLE NO: | 5 |
|---|---|
| FORMULATIONS: | #112 |
| Poly BD ® R45M, **g | 70 |
| Multranol ® 3901, g | 30 |
| Water, g | 2.5 |
| Dabco ® 33LV, g | 0.8 |
| DC-190, g | 1.5 |
| Dabco ® T-12, g | 0.06 |
| NCO Index (Code 129)*** | 105 |
| PROCESSING: | |
| Initial Temp °C. | 23 |
| Cream Time, sec. | 5 |
| Rise Time, sec. | 90 |
| PHYSICAL PROPERTIES: | |
| Density, Kg/m³ | 42.6 |
| Compression Set: 50% | 9.4 |
| Humid Aging: 50%, 105° C., 6 Hrs. | 4.3 |

*Dibenzal sorbitol
**1.0% by weight of DBS was dissolved in the polyol
***0.5% by weight of DBS was dissolved in Code 129.

TABLE 4

POLY BD - NIAX 31-28 - PLURACOL 726 - CODE 129 FOAMS

| EXAMPLE NO: | 6 | 7 | 8 | 9 |
|---|---|---|---|---|
| FORMULATIONS: | #134 | #135 | #136 | #137 |
| Poly BD ® R45M, g | 60 | 60 | 70 | 70 |
| Niax ® 31-28, g | 30 | 10 | 20 | 10 |
| Pluracol ® 726, g | 10 | 30 | 10 | 20 |
| Water, g | 2.5 | 2.5 | 2.5 | 2.5 |
| Dabco ® 33LV, g | 0.8 | 0.8 | 0.8 | 0.8 |
| DC-190, g | 1.5 | 1.5 | 1.5 | 1.5 |
| Dabco ® T-12, g | 0.06 | 0.06 | 0.06 | 0.06 |
| NCO Index 105 (Code 129) | 105 | 105 | 105 | 105 |
| PROCESSING: | | | | |
| Initial temp., °C. | 24 | 24 | 24 | 24 |
| Cream time, sec. | 5 | 5 | 5 | 5 |
| Rise time, sec. | 78 | 94 | 95 | 95 |
| Appearance | normal | normal | normal | normal |
| PHYSICAL PROPERTIES: | | | | |
| Density, Kg/m³ | 53.1 | 52.3 | 52.5 | 51.4 |
| Compression Set: 50% | 9.8 | 6.1 | 5.5 | 5.3 |
| Humid Aging: 50%, 105° C., 6 Hrs. | 5.82 | 6.03 | 5.70 | 3.71 |
| CLD (50%) KPa: | 27.1 | 23.2 | 16.2 | 12.0 |

TABLE 5

POLY BD - POLYTAIL HA - NIAX 31-28 - CODE 129 FOAMS

| EXAMPLE NO: | 10 | 11 | 12 | 13 |
|---|---|---|---|---|
| FORMULATIONS: | #138 | #139 | #140 | #141 |
| Poly BD ® R45M, g | 60 | 60 | 60 | 60 |
| Polytail ® HA, g | 20 | 20 | 20 | 20 |
| Niax ® 31-28, g | 20 | 20 | 20 | 20 |
| Water, g | 2.5 | 2.5 | 2.5 | 2.5 |
| Dabco ® 33LV, g | 0.8 | 0.8 | 0.8 | 0.8 |
| DC-190, g | 1.5 | 1.0 | 1.0 | 1.0 |
| L-5340, g | 0 | 1.0 | 1.0 | 1.0 |
| Dabco ® T-12, g | 0.06 | 0.06 | 0.06 | 0.06 |
| NCO Index (Code 129) | 105 | 105 | 80 | 120 |
| PROCESSING: | | | | |
| Initial Temp., °C. | 22 | 22 | 24 | 24 |
| Cream Time, sec. | 5 | 5 | 4 | 4 |
| Rise Time, sec. | 95 | 85 | 120 | 80 |
| PHYSICAL PROPERTIES: | | | | |
| Density, Kg/m³ | 67.1 | 57.8 | 45.2 | 55.2 |
| Compression Set: 50% | 6.2 | 4.9 | 5.6 | 6.4 |
| Humid Aging: 50%, 105° C., 6 Hrs. | 4.6 | 5.1 | 5.9 | 7.6 |
| CLD (50%) KPa: | 24.1 | 16.0 | 13.8 | 22.4 |

TABLE 6

EFFECT OF TEMPERATURE ON COMPRESSION FORCE DEFLECTION

| EXAMPLE NO. | FORMULATION # | CLD AT DIFFERENT TEMPERATURE (50%) KPa | | |
|---|---|---|---|---|
| | | −30° C. | 24° C. | 80° C. |
| 14 | 140 | 15.9 | 13.8 | 10.3 |

EXAMPLES 1-4

Blended polyols prepared by adding various Poly (oxyalkylene) polyols, i.e. polyether polyols, gave low density and low compression set foams as shown in Examples 1-4 in Table 2.

As indicated in Table 2, cream time is the time period between the start of mixing of the components and the beginning of the foam rise. Rise time is the time between the start of mixing of the components and the point at which the foam rise is completed. The initial temperature indicates the temperature of the materials at the beginning of the foaming reaction.

All the physical properties were tested under ASTM Test Standard D-3574 with the only exception that the humid aging test was conducted for 6 hours instead of 3 hours as specified by D-3574. The compression load deflection (CLD) at 50% indicates the amount of force required to deform a foam part to a 50% deflection value, i.e. it is an indication of the firmness of the part.

The compression set values achieved by Examples 1-4 are in the range of between 7 to 8 which is significantly lower than the normal compression set value of approximately 20 for high resilience seat foams. The humid aging data obtained, i.e. within the range between 4 to 5, are also well within the allowable maximum value of 30.

EXAMPLE 5

In Example 5, DBS (dibenzal sorbitol) was used as the thixotropic agent, and its effectiveness in preventing penetration of a foaming system into foam cells was confirmed. In addition, the effect of DBS on the compression set was examined.

The formulation employed is shown in Table 3. It is seen that the resulting foam had good compression set data. In addition, the foaming mixture (1-2 grams) was put into a small foam void of flexible urethane foam. After foam rise, no penetration of the void-filled foam into other foam cells was observed.

EXAMPLES 6-9

In these Examples, three-component polyol blends instead of two-component were investigated, i.e., Poly BD ® R45M, Niax ® 31-28 and Pluracol ® were used. The results obtained are shown in Table 4. Again, low compression set values were obtained in these Examples.

EXAMPLES 10-13

Three-component blends consisting of two polyolefinic polyols of Poly BD® R45M and Polytail® HA, and a polyether polyol of Niax® 31-28 were used in Examples 10-13. The results obtained are shown in Table 5. These polyol blends showed very good compression set data at a wide range of isocyanate index, e.g., 80-120.

EXAMPLE 14

One of the important requirements in automotive seat cushions is the load-bearing property of automotive seats. In a cold climate, the load-bearing property should be similar to that in a tropical climate. Compression Load Deflection (CLD) of foam samples #140 and #144 at −30° C., 24° C. and 80° C. were tested and the results are listed in Table 6. The differences found in CLD between the temperatures are within the allowable range.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of making high resilience urethane foams having superior compression set properties by intimately mixing the component of an organic isocyanate having at least two isocyanate groups with a polyol blend consisting of (a) a polyolefinic polyol having at least two hydroxyl groups selected from the group consisting of polybutadiene, polyisoprene and hydrogenated products thereof, and (b) a polyether polyol in a weight ratio of a/b being from 95/5 to 50/50, in the presence of a blowing agent, a surfactant, a urethane catalyst and optionally a benzal sorbitol and other additives.

2. A method of making high resilience urethane foams having superior compression set properties by intimately mixing the component of an organic isocyanate having at least two isocyanate groups, with a polyol blend consisting of (a) at least one polyolefinic polyol having at least two hydroxyl groups and a molecular weight of about 1,000-5,000 selected from the group consisting of polybutadiene, polyisoprene and hydrogenated products thereof, and (b) at least one polyether polyol having a molecular weight of about 3,000-6,000 in a weight ratio of a/b being from 95/5 to 50/50, in the presence of a blowing agent, a surfactant, a urethane catalyst and optionally an additive.

3. A method of making high resilience urethane foams according to claim 1, wherein a benzal sorbitol is added to both the polyisocyanate component and the polyol component, respectively, as a thixotropic agent in an amount of 0.1 to 5.0 weight percent.

4. A method of making high resilience urethane foams according to claim 1, wherein a dibenzal sorbitol is added to both the polyisocyanate component and the polyol component, respectively, as a thixotropic agent in an amount of 0.1 to 5.0 weight percent.

5. A method of making flexible urethane foams according to claim 2, wherein the blend ratio of polyolefinic polyol to polyoxyalkylene polyether polyol being in the range between 80/20 to 70/30.

6. A method of making flexible urethane foams according to claim 2, wherein the polyolefinic polyol is polybutadiene, having a molecular weight of about 1,000 to 5,000.

7. A method of making flexible urethane foam according to claim 2, wherein the polyolefinic polyol is hydrogenated polybutadiene having a molecular weight of about 1,000 to 5,000.

8. A method of making flexible urethane foam according to claim 2, wherein the polyisocyanate is a liquefied 4,4'-diphenylmethane diisocyanate having an isocyanate equivalent of about 130 to 190.

9. A method of making flexible urethane foams according to claim 2, wherein the blowing agent is water.

* * * * *